Feb. 16, 1954   R. R. RANEY   2,669,461
FRAME CONSTRUCTION FOR VEHICLE RUNNING GEARS
Filed Sept. 29, 1950   3 Sheets-Sheet 1
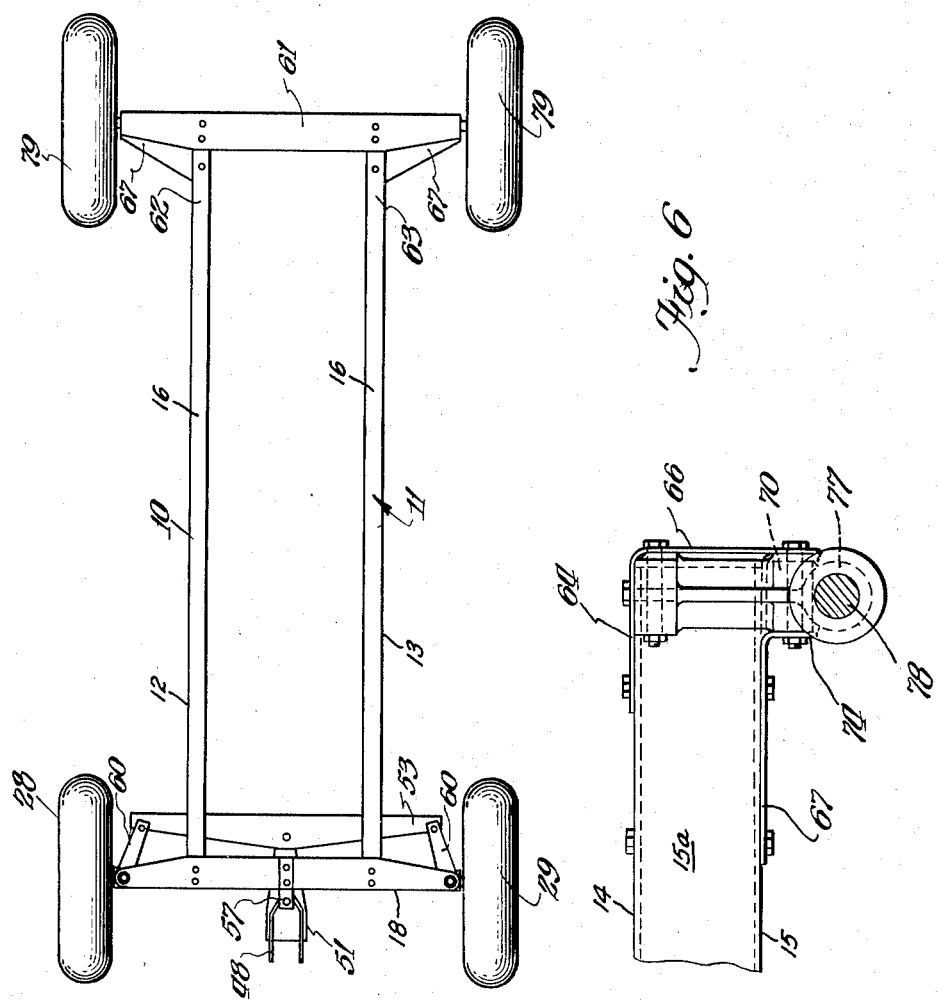
Inventor:
RUSSELL R. RANEY
By: Paul O. Pippel
atty.

Feb. 16, 1954
R. R. RANEY
2,669,461
FRAME CONSTRUCTION FOR VEHICLE RUNNING GEARS
Filed Sept. 29, 1950
3 Sheets-Sheet 2
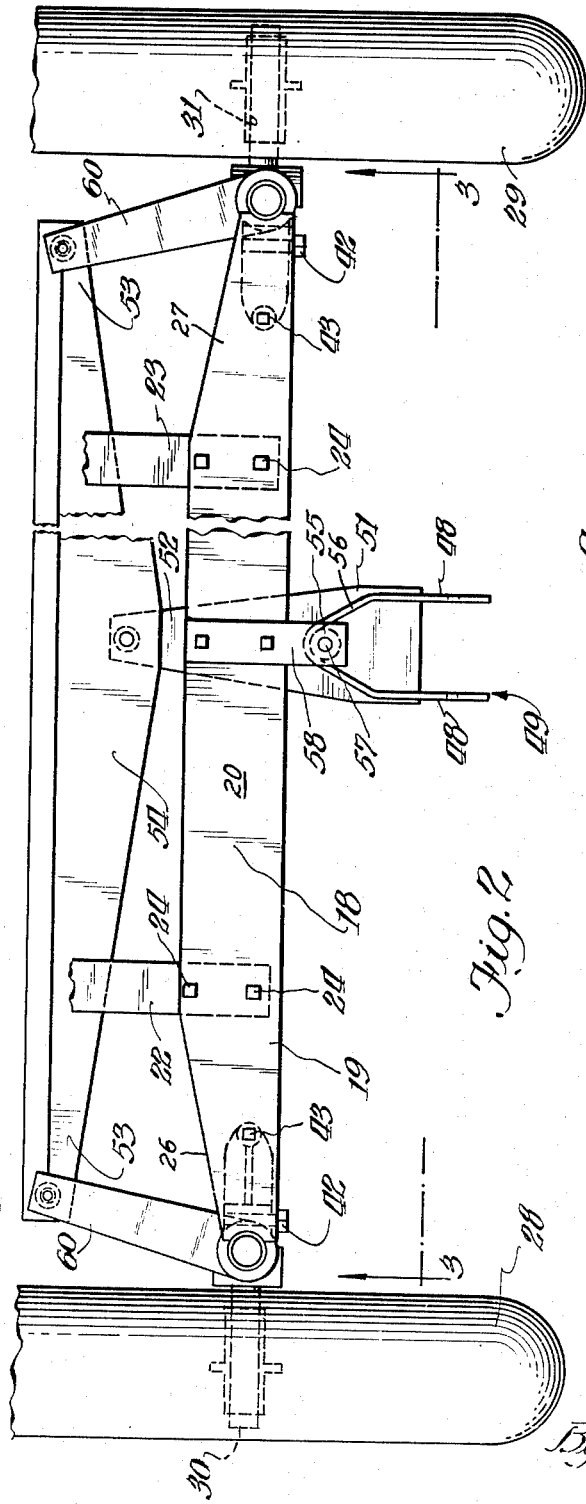
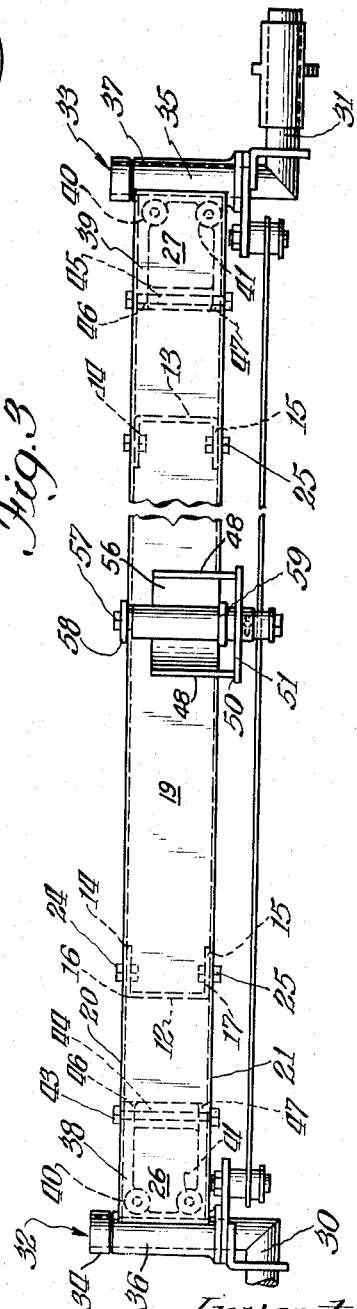
Inventor:
RUSSELL R. RANEY
By Paul O. Pippa
Atty.

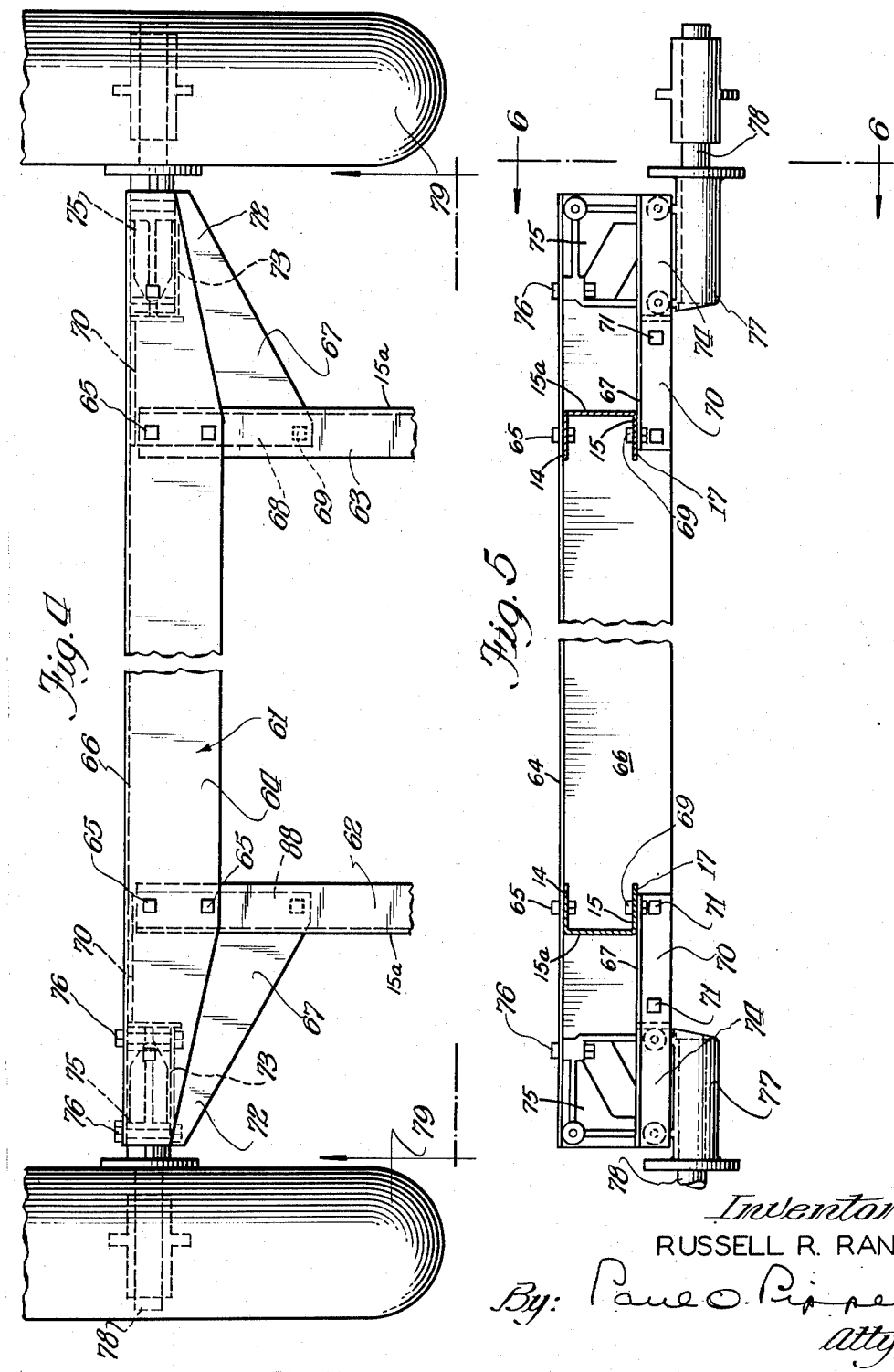

Patented Feb. 16, 1954

2,669,461

UNITED STATES PATENT OFFICE 2,669,461

FRAME CONSTRUCTION FOR VEHICLE RUNNING GEARS

Russell R. Raney, La Grange, Ill., assignor to International Harvester Company, a corporation of New Jersey Application September 29, 1950, Serial No. 187,469

6 Claims. (Cl. 280—103)

This invention relates to a new and improved running gear for a farm wagon or the like.

An object of the invention is the provision of a light weight sturdy four-wheel running gear for farm wagons.

The present invention contemplates the utilization of structural members in the construction of the running gear having well-known forms and shapes such as channel and L-shaped steel beams. The invention further contemplates a relatively few number of such parts connected together in a novel manner to produce a wagon running gear capable of movably supporting heavy loads over rough or uneven terrain such as agricultural fields.

Another object is the provision of a wagon running gear having a rectangular configuration in which the ends of the side sills are connected to the axle beams in a novel manner, resulting in connections possessing more than the usual rigidity without impairing the ability of the structure to traverse undulating or uneven road beds.

A further object is to provide novel attachment means for connecting the rear wheel supporting members to the rear axle beam.

The foregoing and other important objects and desirable features inherent in and encompassed by the invention together with many of the purposes and uses thereof will become readily apparent from a reading of the ensuing description in conjunction with the annexed drawings in which:

Fig. 1 is a plan view of a wagon running gear constructed in accordance with the invention.

Fig. 2 is an enlarged plan view of the front axle beam showing the steering mechanism positioned thereon.

Fig. 3 is a front elevational view taken substantially along line 3—3 of Fig. 2.

Fig. 4 is an enlarged plan view of the rear axle beam.

Fig. 5 is an elevational view taken substantially along line 5—5 of Fig. 4 showing the novel means for connecting the wheel supporting members to the rear axle beam.

Fig. 6 is a detail view taken substantially along line 6—6 of Fig. 5.

Referring to the drawings in which like reference characters designate like elements throughout the various views there is shown a wagon running gear or under-carriage structure adapted to have a platform, wagon box or other cargo carrying device (not shown) mounted directly thereupon. The wagon running gear comprises a pair of transversely spaced longitudinally extending horizontal side sill members 10 and 11. The sill members 10 and 11 are channel-shaped with the web portions 12, 13 vertically disposed. The flanged portions 14 and 15 of the sill members 10, 11 project inwardly of the vertical outboard webs 15a thereof and provide an upper surface 16 vertically spaced from a lower surface 17.

The front axle beam 18 is formed from steel plate into a beam of channel or U-shape in cross section as best seen in Figs. 2 and 3. The web or wall portion 19 of the axle beam 18 is vertically disposed and connects rearwardly projecting vertically spaced flange portions 20 and 21. The forward terminal ends 22, 23 of the sill members 10 and 11 are inserted between the flange portions 20 and 21 when assembling the running gear. It will be evident that in this position the web portions 12, 13 are perpendicular to the flange portions 20 and 21 and the upper flange portion 20 overlaps part of the upper surface 16 while a part of the lower surface 17 rests upon the lower flange portion 21. The upper flange portion 14 of each sill member 10 and 11 is connected to the upper flange portion 20 of the front axle beam 18 by means of bolts 24. Similarly, the lower flange portions 15 are rigidly attached to the lower flange portion 21 by bolts 25.

Positioned outwardly of the terminal ends 26, 27 of the front axle beam 18 are ground engaging wheels 28, 29. The wheels 28, 29 are journaled for rotation upon horizontal leg portions 30, 31 of L-shaped steering spindles 32, 33 respectively. The vertical leg portions 34, 35 of the spindles 32, 33 are journaled in sleeves 36, 37. The sleeves 36, 37 are rigidly attached to and form a part of the wheel supporting members designated generally by numerals 38, 39. Each wheel supporting member 38, 39 has a pair of horizontally disposed bosses 40, 41 adapted to abut against the web portion 19 of the front axle beam 18 and be connected thereto by means of bolts 42. The front wheel supporting members 38, 39 are also fastened to the flange portions 20, 21 by bolts 43 passing through a vertically disposed bore 44, 45 formed in each member 38, 39 and aligned apertures 46, 47 in the flange portions.

The wagon running gear is connected to the tractor or other draft means by a coupling bar (not shown). The coupling bar has one end pivotally connected between a pair of vertically disposed plates 48 of a substantially U-shaped hitch member 49. The lower marginal edge 50 of each plate is welded to a horizontally disposed rearwardly extending plate 51. It will be noted that plate 51 passes beneath the front axle beam 18 and has one end 52 pivotally connected intermediate the ends 53 of a transversely disposed tie rod or bar 54. A sleeve 55 is welded to the bight portion 56 of the hitch member 49. A bolt 57 journaled in the sleeve 55 is supported by the front axle beam 18 by means of vertically spaced brackets 58, 59 fastened to and projecting forwardly from the flange portions 20 and 21 respectively. Connected at one end to the vertical leg portions 34, 35 of each steering spindle 32, 33 is a steering arm 60. The opposite ends of arms 60 are pivotally connected to the ends 53 of the tie rod 54. It will be obvious that rotation of the plate 51 about a vertical axis through the bolt 57 will cause the horizontal leg portions 30, 31 to rotate about the vertical axes through vertical leg portions 34, 35 to steer the running gear.

The rear axle beam 61 as best shown in Figs. 4, 5 and 6 has an inverted L-shape in vertical section. The rearward terminal ends 62, 63 of the sill members 10 and 11 are positioned beneath and connected to the horizontally disposed forwardly extending flange portion 64 by means of fastening bolts 65 passing through the flange portion 64 and the upper flange portions 14 of the sill members. The vertically downwardly depending flange portion 66 of the rear axle beam 61 extends below the lower surfaces 17 of the sill members 10 and 11 for a purpose which will be explained hereinafter and is spaced rearwardly of the rear ends of the sills as best seen in Figure 4.

Positioned adjacent the intersection of each sill member 10 and 11 with the flange portion 66 of the rear axle beam 61 is an outwardly extending horizontally disposed truss plate or gusset 67. Each plate 67 has one or inboard marginal edge 68 abutting the lower surface 17 of the lower flange portion 15 and secured thereto by bolts 69. As best shown in Fig. 5 the plates 67 are each provided with a downwardly depending flange 70 which is rigidly connected to the vertical flange portion 66 of the rear axle beam 61 by means of bolts 71. Extending laterally outwardly from each plate 67 is an extension 72 which is integrally formed with its associated plate. The rearwardly facing marginal edge 73 of the extensions 72 are turned downwardly to provide flange portions 74 longitudinally spaced from and parallel to the vertical flange portion 66 of the rear axle beam 61 and the flanges 70 of the plates 67. A rear wheel supporting member 75 is received between each flange portion 74 and the vertical flange 70. Connecting bolts 76 are used to fasten the members 75 to the rear axle beam 61 and the extensions 72. Each supporting member 75 has a horizontally disposed sleeve element 77 adapted to non-rotatably support a rear wheel spindle 78. Rear ground engaging wheels 79 are rotatably journaled on the spindles 78 in any suitable manner. It will be evident that plates 67 and integrally formed extensions 72 perform a dual function. They reinforce the connections between the sills and the rear axle beam and provide a simplified mounting structure for the rear wheel supporting members.

The embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude but rather to suggest such other modifications and adaptations as fall within the spirit and scope of the invention as defined in the appended claims.

What is claimed is:

1. In a vehicle running gear: a channel-shaped transversely extending front axle beam having a vertically disposed web portion connecting rearwardly projecting, vertically spaced flange portions; a pair of U-shaped transversely spaced, longitudinally extending sill members, each sill member having generally horizontal top and bottom webs and a substantially vertical interconnecting outboard web, the forward terminal end of each sill member positioned between said flange portions and secured thereto whereby said flange portions partially embrace said top and bottom webs of the sill members; front wheel supporting members fixed to the terminal ends of said front axle beam; a rear axle beam extending across the rear ends of said sill members and projecting outboardly thereof and having a forwardly projecting, horizontally disposed flange portion overlying the rearward terminal ends of said sill members and secured to the top webs thereof, said rear axle beam further having a rear vertically disposed flange portion spaced rearwardly from the rear extremities of said sill members; a horizontal plate adjacent each end of the rear axle beam, each plate having an inboard edge connected to the lower web of the adjacent sill member and extending from the rear end thereof to a point a substantial distance forwardly of said horizontally disposed flange portion of the rear axle beam, each plate member having a first downwardly depending flange portion abutting and secured to said vertically disposed portion of said rear axle beam outwardly of the adjacent sill member and a laterally outwardly extending portion having a second downwardly depending flange portion longitudinally and transversely spaced and substantially parallel to said vertically disposed portion of said rear axle beam; and rear wheel supporting members secured between said second flange portions and said vertically disposed portion of said rear axle beam.

2. In a vehicle running gear: a channel-shaped, transversely extending front axle beam having its flange portions projecting rearwardly; a pair of transversely spaced, longitudinally extending sill members having inwardly projecting, vertically spaced top and bottom walls, the forward terminal ends of each sill member being inserted between and secured to said flange portions whereby a portion of said bottom wall lies on one of said flange portions and the other flange portion overlaps a portion of said top wall; front wheel supporting members fixed to the terminal ends of said front axle beam; an inverted L-shaped in vertical section rear axle beam extending at opposite ends outwardly of the sill members and having its horizontally disposed flange portion extending forwardly over and secured to the top wall of the rearward terminal end of each sill member; a horizontally disposed plate member at each end of the rear axle beam, each plate member having one marginal edge fastened to the bottom wall of the adjacent sill member at the rearward terminal portion thereof and extending a substantial distance forwardly of said horizontally disposed flange portion of the rear axle beam, said plate members having a first downwardly depending flange portion abutting and secured to the vertically disposed flange portion of said rear axle beam and a laterally outwardly extending portion having a second downwardly depending flange portion longitudinally and transversely spaced and substantially parallel to said vertically disposed portion; and rear wheel supporting members secured between said second flange portion and said vertically disposed portion of said rear axle beam.

3. In a vehicle running gear: a pair of channel-shaped longitudinal sill members each having spaced inwardly extending top and bottom flanges and an outboard interconnecting wall; a channel-shaped front axle beam having top and bottom walls receiving one end of each sill member between said walls and rigidly secured only to the top and bottom flanges thereof, respectively; a rear axle beam having an inverted L vertical cross section; means connecting the top flanges of the opposite ends of said sill members to the horizontally disposed portion of said rear axle beam; a horizontally disposed plate member fastened to each sill member along one marginal edge and extending outwardly therefrom, said plate members each having a first depending flange portion positioned along the forward side of the vertically disposed portion of the rear axle beam and fastened thereto and having a laterally outwardly extending portion presenting a second depending flange portion substantially parallel to and longitudinally spaced from said first flange portion; and rear wheel supporting members connected to said second flange portion and said rear axle beam outboardly of said sill members.

4. A rear wheel supporting structure for a wagon running gear having a pair of transversely spaced, longitudinal sill members comprising an inverted L-shaped, transversely extending axle beam having a forwardly extending, horizontally disposed portion overlying and connected to the top sections of the rear ends of said sill members; a plate member positioned outwardly of each sill member adjacent the intersection of said rear axle beam and said sill members, said plate members each having an inboard marginal edge connected to the bottom section of the adjacent sill member and further having a vertically disposed flange substantially perpendicular to a vertical plane containing said marginal edge connected to the vertical portion of said rear axle beam, each of said plate members having an outwardly projecting portion provided with a downwardly depending flange transversely spaced from the vertical portion of said rear axle beam; and a rear wheel supporting member at each end of the beam spaced outwardly of said sills and positioned beneath said horizontally disposed portion between said vertical portion and adjacent said downwardly depending flange and connected thereto, said vertical portion being spaced rearwardly of the rear ends of the sill members and the span between the rear ends of said sill members being formed solely by the intermediate segment of said L-shaped beam.

5. A rear wheel supporting structure for a wagon running gear having a pair of transversely spaced, longitudinal sill members comprising an inverted L-shaped, transversely extending axle beam having a vertically disposed portion spaced rearwardly of the rear ends of said sill members and a forwardly extending horizontally disposed portion overlying and connected to the rear ends of said sill members, the end portions of the beam projecting outwardly from the sill members; a plate member connected to a lower portion of each sill member and the vertically disposed portion of the adjacent end portion of said rear axle beam, each of said plate members having a projection extending transversely outwardly from said sill members, said projections each being provided with a depending flange transversely spaced and substantially parallel to the vertically disposed portion of said rear axle beam; and a rear axle supporting member positioned between each of said depending flanges and the vertically disposed portion of the adjacent end portion of the beam, and means for effecting a relatively rigid connection between each end portion and adjacent sill member.

6. In a vehicle running gear, a U-shaped transverse front axle beam comprising a generally vertical front wall and rearwardly extending top and bottom flanges, front wheels steerably connected to said front axle beam, a pair of laterally spaced U-section sill members each including a substantially vertical outboard wall and inboardly extending top and bottom webs, said sill members having their forward ends positioned between said flanges of the front axle beam, means only securing said top and bottom flanges of the front axle beam respectively, to the top and bottom webs of said sill members whereby accommodating unrestricted torsional flexing of the forward ends of said vertical walls of the sill members, an L-shaped transverse rear axle beam extending across the rear ends of said sill members and having a rear depending web spaced rearwardly of the rear ends of said sill members and also having a top web overlying the rear terminals of said sill members and secured to the top webs thereof only, whereby accommodating unrestrictive torsional flexing of the rear ends of said vertical walls of the sill members and enhancing the torsional flexibility of the rear axle beam intermediate the sill members, said rear axle beam having end portions extending outwardly of said sill members, a truss element disposed within each end portion of said rear axle beam and at its inboard edge underlying and connected to the bottom web of the adjacent sill member and at its rear edge connected against the forward side of the rear web of the related end portion along the lower margin thereof, and a rear wheel supporting member disposed within each end portion and connected to the rear and top webs thereof and to the related truss element, said U-section front axle beam providing a relatively rigid structure whereby maintaining the front wheels in steerable alinement as the vehicle traverses uneven terrain, said truss elements rigidifying said end portions of the rear axle beam with respective sill members whereby effecting torsional loading of the latter during relative vertical movements of the rear wheels of the vehicle.

RUSSELL R. RANEY.

References Cited in the file of this patent

UNITED STATES PATENTS

| Number | Name | Date |
|---|---|---|
| 270,382 | Brosius | Jan. 9, 1883 |
| 1,411,875 | Schroeder | Apr. 4, 1922 |
| 1,848,895 | MacPherson | Mar. 8, 1932 |
| 2,027,898 | Broulhiet | Jan. 14, 1936 |
| 2,420,794 | O'Neill | May 20, 1947 |

FOREIGN PATENTS

| Number | Country | Date |
|---|---|---|
| 548,541 | Great Britain | Oct. 14, 1942 |